United States Patent [19]

Hambright

[11] Patent Number: 5,215,425
[45] Date of Patent: Jun. 1, 1993

[54] TRACTOR TOWING APPARATUS

[76] Inventor: Prentiss D. Hambright, P.O. Box 182, Kings Mountain, N.C. 28086

[21] Appl. No.: 706,166

[22] Filed: May 28, 1991

[51] Int. Cl.⁵ .................................. B60P 3/06
[52] U.S. Cl. ..................... 414/481; 280/402; 280/418.1; 280/425.1
[58] Field of Search .......... 414/481, 563, 685; 280/402, 418.1, 425.1, 495; 410/29, 30, 49, 19, 20

[56] References Cited

U.S. PATENT DOCUMENTS

| | | | |
|---|---|---|---|
| 1,299,912 | 4/1919 | Butterworth | 410/19 X |
| 1,374,224 | 4/1921 | Patterson | 414/563 |
| 2,009,149 | 7/1935 | Pierce | 410/29 |
| 2,325,869 | 8/1943 | Mosling | 414/563 X |
| 2,389,211 | 11/1945 | Pointer | 414/481 |
| 3,147,871 | 9/1964 | Rogers | 280/418.1 X |
| 3,169,650 | 2/1965 | Soyland | 280/402 X |
| 3,333,718 | 8/1967 | Durham | 280/418.1 X |
| 3,536,340 | 10/1970 | Talbert | 414/481 X |
| 3,656,780 | 4/1972 | Nordstrom | 280/418.1 |
| 4,037,681 | 7/1977 | Gorby | 280/495 X |
| 4,427,211 | 1/1984 | Bruna et al. | 414/481 X |
| 5,056,984 | 10/1991 | Hesterman | 280/402 X |
| 5,106,897 | 5/1991 | Kauffman | 414/563 X |

FOREIGN PATENT DOCUMENTS 458515  8/1949  Canada ................. 280/402

Primary Examiner—David A. Bucci
Attorney, Agent, or Firm—Jack C. Munro

[57] ABSTRACT

A dolly and a hitch attachment for towing of a tractor vehicle such as a backhoe. The hitch attachment is tied to the front of the tractor vehicle and then connected by a ball and socket type of hitch to the towing vehicle. The tractor vehicle is also fixedly mounted on a dolly with the rear wheels of the tractor vehicle located forward of the towing wheels on the dolly.

5 Claims, 1 Drawing Sheet

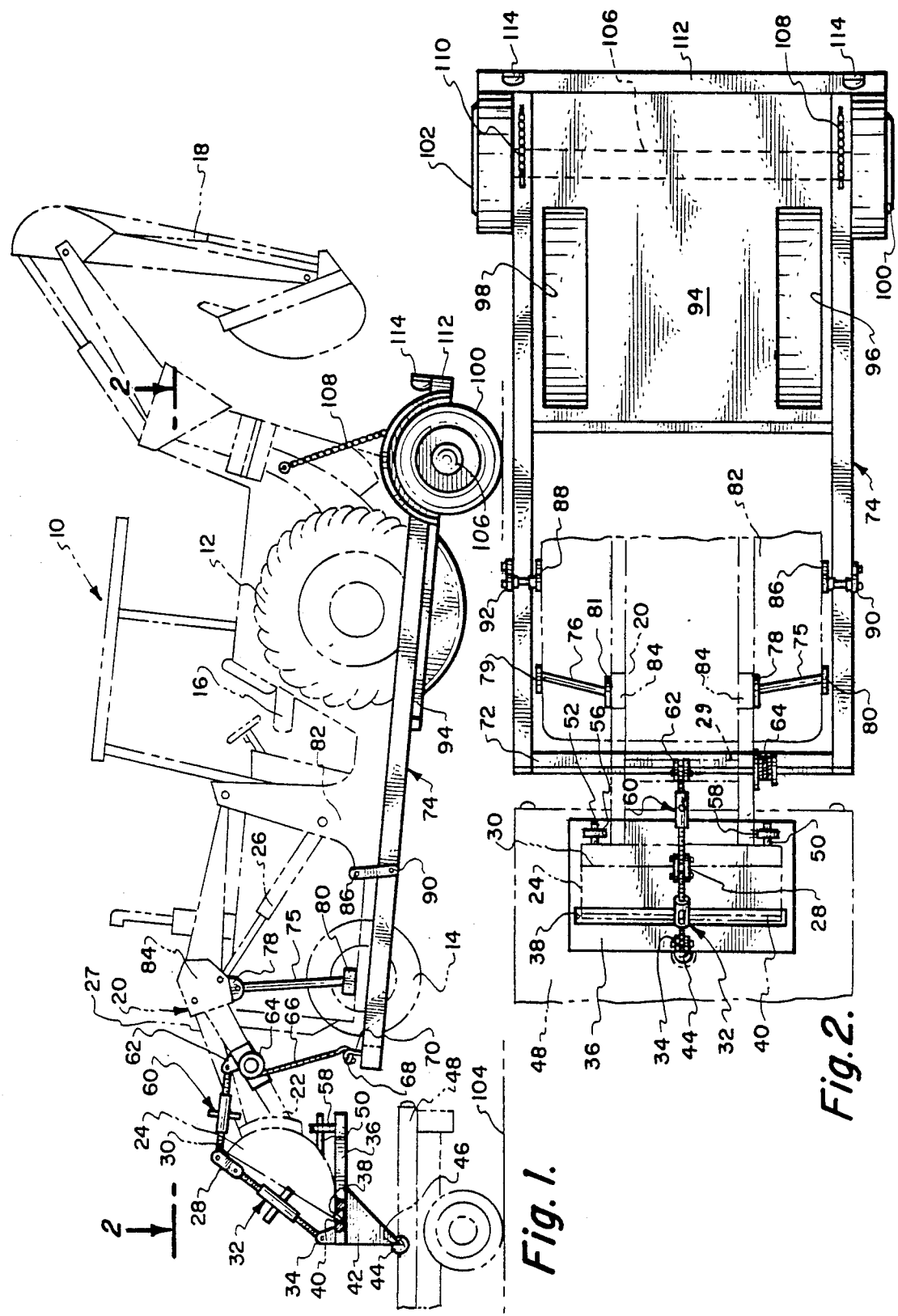

TRACTOR TOWING APPARATUS

BACKGROUND OF THE INVENTION

1) Field of the Invention

The field of this invention relates to vehicle towing apparatuses and more particularly to a dolly-type of apparatus which is to be utilized to tow a tractor-type vehicle in conjunction with a towing vehicle.

2) Description of Related Art

Conventional earth-moving equipment is designed to be transported from one job location to another job location. Generally, this transportation is accomplished by the means of some form of a trailer or a truck with the trailer or truck being designed to be adaptable to the requirements of the road. Thus, local road laws and regulations play an important part in the design of earth moving equipment that is intended to be generally used "off the road".

A backhoe is a power digging machine consisting of a jointed arm with a bucket that scoops toward the operator as the bucket is operated. The bucket is mounted at the back of a tractor or other vehicle and due to its pulling motion, is like a hoe. Thus, the name backhoe. Normally, the entire vehicle is referred to as a backhoe. In the most common configuration, the entire vehicle constitutes a tractor with the digging bucket mounted at the rear end and a loading bucket mounted at the front. This is an exceedingly common form of earth-moving heavy equipment.

Backhoes come in various sizes. Most backhoes are not capable of traveling at any significant speed making it impractical for backhoes to be driven under their own power from location to location. Normally, the backhoe must be hauled requiring such to be moved by means of roadways. The most common way to haul a backhoe is either to chain it onto a large flatbed truck or to chain it onto a trailer behind a towing vehicle such as a truck.

There are certain disadvantages to these methods of hauling a backhoe. On a flatbed truck, the backhoe is very high creating a high center of gravity with the overall rig being quite heavy. A high center of gravity is obviously more prone to tipping than a low center of gravity. On a trailer, although the resulting center of gravity is lower, its overall length makes it hard to handle by the operator of the towing vehicle. The overall weight of such a rig is relatively heavy which makes the rig hard to handle because of the weight.

Aforementioned both types of rigs are heavy and cumbersome making road safety somewhat less than ideal. Recently there is being instituted in several States new restrictions on the licensing of drivers who wish to drive such rigs. Even a relatively small backhoe on a trailer behind a dual wheel pickup truck will be considered over the weight limit for a regular driver's license. Qualifying for the correct license will be difficult for many individuals which will result in a shortage of certified drivers for such rigs.

SUMMARY OF THE INVENTION

The structure of the present invention relates to an apparatus that makes it possible to haul a backhoe (and possibly other heavy equipment) without a normal trailer or large flatbed truck. The entire hauling rig has a lower center of gravity than prior art type of hauling apparatuses and is substantially lighter in weight than those apparatuses. The weight is sufficiently less to fall below the weight limit for which a specialized driver's license would be needed.

Another objective of the present invention is that because of the lower center of gravity of the apparatus and its relatively short length, the overall apparatus is much easier to handle and is therefore much safer on the road.

Another objective of the present invention is to have the backhoe to become its own trailer through the use of a special hitch attached between the backhoe and the towing vehicle and the utilizing of a special dolly beneath the rear wheels of the backhoe.

Another objective of the present invention is to construct an apparatus for hauling a backhoe or other similar type of equipment which can be manufactured at a reasonable cost and therefore sold to the ultimate consumer at a reasonable cost.

The towing apparatus of the present invention is to utilize the towed equipment in achieving the towing operation. The towed equipment is in the form of a tractor which has a loading bucket mounted in the front. This loading bucket is to be fastened to a hitch attachment with this hitch attachment being pivotally mounted to the towing vehicle. Typical installation on the towing vehicle by means of a ball and socket, or other equivalent type of trailer hitch arrangement, mounted on the flatbed of a truck. The loading bucket includes a movable arm and this movable arm is tied by a winch cable to the dolly frame which supports the tractor. Appropriate tie-down means is included between the frame and the tractor. The dolly terminates at the rear end thereof into a set of wheels which are connected by an axle. These wheels are mounted aft or rearwardly of the rear wheels of the tractor and the reason for this is so that the overall weight distribution of the towed vehicle is located forward of the rear wheels.

BRIEF DESCRIPTION OF THE DRAWING

FIG. 1 is a side elevational view of the towing apparatus of the present invention showing the towing apparatus as it would be depicted to two a typical tractor vehicle such as a backhoe; and FIG. 2 is a top plan view of the towing apparatus of the present invention taken along line 2—2 of FIG. 1.

DETAILED DESCRIPTION OF THE SHOWN EMBODIMENT

Referring particularly to the drawing, there is depicted a backhoe type of tractor vehicle 10 which has an enlarged set of rear wheels 12 and a set of forward wheels 14. The tractor vehicle 10 is adapted to be operated by a human being from a driver's compartment 16. Connected to the back end of the tractor vehicle 10 is a digging bucket assembly 18. A loading bucket assembly 20 is mounted at the front end of tractor vehicle 10. The loading bucket assembly 20 includes a movable arm assembly 22 to which is pivotally connected at the outer end thereof a loading bucket 24. The arm assembly 22 is to be pivotally moved by means of a hydraulic actuator assembly 26 with this movement to be substantially vertical. The loading bucket 24 is tilted by means of actuator 27 which connects between arm assembly 22 and loading bucket 24. The arm assembly 22 comprises two (in number) arm members located in a spaced apart arrangement. These two arm members are interconnected by a cross brace 29.

The tractor vehicle 10 is modified slightly from a conventional tractor vehicle 10. This modification has to do with the mounting of a bracket 28 on the upper edge 30 of the loading bucket 24. The bracket 28 is mounted at approximately the transverse midpoint of the loading bucket 24. The bracket 28 is basically comprised of a pair of plates which are interconnected by a pair of spaced apart pins. One of these pins is to connect with a hole formed at one end of a turnbuckle assembly 32. The turnbuckle assembly 32 is to be manually operable to be tightened. The opposite end of the turnbuckle assembly 32 is also to include a hole (not shown) which is to connect with a pin mounted within mounting bracket 34.

The mounting bracket 34 is fixedly mounted on a platform 36. On the platform 36 is a trough 38. This trough 38 is to accommodate the forward lower edge 40 of the loading bucket 24. It is the function of the trough 38 to retain in place the edge 40 of the loading bucket 24. The turnbuckle assembly 32 is to function to securely hold in place the loading bucket 24 on the platform 36 and the edge 40 within the trough 38.

Fixedly attached to the bottom of the platform 36 is a post 42. The post 42 is to be appropriately braced to be sufficiently strong. At the lower or apex end of the post 42 is mounted a hitch ball 44. This ball 44 is to engage with a socket 46 mounted within the bed 48 of a towing vehicle. Basically, the socket 46 and the ball 44 is to give a general representation of a hitch configuration which is deemed to be conventional. It is the function of this hitch configuration to permit general pivoting movement between the platform 36 and the bed 48 of the towing vehicle.

Fixedly mounted on the backside of the loading bucket 24 are a pair of spaced apart pins 50 and 52. Each pin 50 and 52 is to be fixedly attached as by welding to the loading bucket 24. Pin 50 is to close fittingly connect with a hole in a lug 58. Pin 52 is to connect with a hole formed in lug 56. Lugs 56 and 58 are fixedly mounted onto the platform 36. It is the function of these lugs 56 and 58 and the pins 50 and 52 to vertically fix in position the loading bucket 24 onto the platform 36.

To further secure the loading bucket 24, there is used a turnbuckle assembly 60. One of the turnbuckle assembly 60 is mounted to the unattached pin of the bracket 28. Again, the turnbuckle assembly 60 is to include a hole (not shown) through which a pin of the bracket 28 is conducted. The opposite end of the turnbuckle assembly 60 will include a hole which is to connect with a pin which is mounted between a closely arranged set of plates forming a bracket 62. This bracket 62 is fixedly mounted onto the cross brace 29 located between the arm members 21 and 23 of the arm assembly 22. It is to be understood that the turnbuckle assemblies 32 and 60 will be tightened securely fixing in position the loading bucket 24 onto the platform 36.

Also mounted on the movable arm assembly 22 is a manually (or electrically) operated winch assembly 64 or other power lift such as a jack or hydraulic cylinder. Associated with the winch assembly 64 is a cable 66. This cable 66 can be extended or retracted and the outer end of the cable 66 is connected to a hook 68. The hook 68 engages with a hook 70 which is fixedly mounted on cross member 72 of a dolly frame 74. By operating of the winch assembly 64, the dolly frame 74 is snugly secured in position against the tractor vehicle 10.

To further insure that there will be no movement occurring between the loading bucket assembly 20 and the body of the tractor vehicle 10, there is utilized a pair of braces 75 and 76. Brace 75 connects between appropriate connecting brackets 78 and 80. Bracket 80 is fixedly mounted onto the body 82 of the tractor vehicle 10. Bracket 78 is to be fixedly mounted onto the upper end section 84 of the left arm member 21 of the movable arm assembly 22. Brace 76 connects between a bracket 81 mounted on right arm member 23 and bracket 79 mounted on body 82 of tractor vehicle 10. Bracket 79 is located on the right side of body 82 with bracket 80 located on left side of body 82.

Mounted on the left side of the body 82 is a connector 86. A similar connector 88 is mounted on the right side of the body 82. When the tractor vehicle 10 is located on the frame 74 as shown in FIG. 1 of the drawing, the connector 86 is to securely connect with a mating connector 90 which is mounted on the frame 74. In a similar manner, the connector 88 securely connects with a connector 92 which is mounted on the opposite side of the frame 74. In this manner, the tractor vehicle 10 is securely mounted on the frame 74.

The aft portion of the frame 74 includes a plate 94. Within the plate 94 are formed enlarged recesses 96 and 98. One of the rear wheels 12 is to be located within recess 96 and the remaining rear wheel 12 is to be located in the recess 98. Rolling movement is permitted of the frame 74 by means of dolly wheels 100 and 102 which engage with supportive surface 104. A typical supportive surface 104 would be a roadway. The wheels 100 and 102 are interconnected by a dolly axle 106. Wheels 100 and 102 could each be dual wheels or only a single wheel depending on the weight of tractor vehicle 10.

As a safety measure to insure that the rear end of the tractor vehicle 10 is held in place on the dolly frame 74, there is utilized a pair of tie-down chains 108 and 110 which interconnect between the rear portion of the body 82 and the frame 74.

When the dolly frame 74 is not attached to the tractor vehicle 10, it sits on the supportive surface 104 and looks very much like a ramp. The tractor vehicle 10 is then backed onto the frame 74 so that the rear wheels 12 rest within the recesses 96 and 98.

The hitch attachment, which includes the platform 36, has been connected to the bed 48 of the towing vehicle. The loading bucket 24 is physically moved to a height which is above platform 36. The towing vehicle and the platform 36 is then positioned under the loading bucket 24 and then the loading bucket 24 is lowered so that the forward edge 40 engages with the trough 38. At this particular time, turnbuckle assemblies 32 and 60 are now installed. Also, now installed is the cable 66 with the winch assembly 64 being tightened. This pulls the dolly frame 74 snugly against the bottom of tractor vehicle 10. The connectors 86 and 90 and connectors 88 and 92 are now to be connected. The braces 75 and 76 are now placed in position as well as tie-down chains 108 and 110. The tractor vehicle 10 is now able to be towed by the towing vehicle to any particular desired location.

The rear bumper 112 of the frame 74 is to be rigged with tail and brake lights 114 which are deemed to be conventional. It is to be noted that the rear wheels 12 are positioned between the dolly axle 106 and the front end composed of cross member 72 of the dolly frame 74. The reason for this is so that the overall weight distribution is located to provide the maximum amount of stability. If the rear wheels 12 are located directly above or in back of the dolly axle 106, a substantial amount of instability would be attained which would cause the towing vehicle to experience difficulty is towing while moving along the supportive surface 104.

The apparatus of the present invention allows the tractor vehicle (backhoe) 10 to be hauled as a much shorter overall rig than conventional backhoe type of hauling rigs. Also, the apparatus of the present invention provides a lower center of gravity than previous type hauling rigs and also achieves a much lower weight than previous rigs. This makes the apparatus of the present invention easier to tow, easier to handle, safer to operate and light enough in weight to operate with a normal operator's driver's license.

What is claimed is:

1. In combination with a tractor vehicle having a front end and a rear end, said front end having a loading bucket mounted on a movable arm assembly, a dolly for transporting of said tractor vehicle by a towing vehicle, said tractor vehicle having enlarged rear wheels located directly adjacent said rear end, said dolly comprising:

a frame upon which is to be located said tractor vehicle, towing wheels mounted on said frame directly adjacent said rear end of said tractor vehicle, said towing wheels adapted to roll on a supported surface;

a hitch attachment adapted to connect with a conventional trailer hitch mounted on said towing vehicle, said loading bucket being supportingly mounted on said hitch attachment, means fixedly securing said loading bucket to said hitch attachment; and power lift means connected between said movable arm assembly and said frame, said power lift means for raising said frame and a portion of said tractor vehicle to a raised position from said supportive surface into a snug position between said frame and said portion of said tractor vehicle.

2. The combination as defined in claim 1 wherein:

said frame having a forward end spaced furthest from said towing wheels, said forward end being adapted to come into contact with the supportive surface to facilitate moving of said tractor vehicle onto and off of said frame.

3. The combination as defined in claim 1 wherein:

brace means installed between said movable arm assembly and said frame when said frame and said tractor vehicle are in said raised position thereby preventing movement between said movable arm assembly and said frame.

4. In combination with a tractor vehicle having a front end and a rear end, said front end having a loading bucket, a dolly for transporting of said tractor vehicle by a towing vehicle, said tractor vehicle having enlarged rear wheels located directly adjacent said rear end, said dolly comprising:

a frame upon which is to be located said tractor vehicle, towing wheels mounted on said frame directly adjacent said rear end of said tractor vehicle, said towing wheels adapted to roll on a supporting surface;

a hitch attachment adapted to connect with a conventional trailer hitch mounted on said towing vehicle, said loading bucket being supportively mounted on said hitch attachment, means fixedly securing said loading bucket to said hitch attachment;

said frame including wheel engaging recesses, each said wheel engaging recess being arcuate, each said enlarged rear wheel of said tractor vehicle to rest within a said wheel engaging recess thereby precisely positioning said tractor vehicle on said dolly each and every time said tractor vehicle is transported; and said loading bucket being mounted on a movable arm assembly, power lift means connected between said movable arm assembly and said frame, said power lift means raising said frame and a portion of said tractor vehicle to a raised position from said supportive surface into a snug position between said frame and said portion of said tractor vehicle.

5. The combination as defined in claim 4 wherein:

brace means installed between said movable arm assembly and said frame when said frame and said tractor vehicle are in said raised position thereby preventing movement between said movable arm assembly and said frame.

* * * * *